(12) United States Patent
Mashimo

(10) Patent No.: US 9,327,568 B1
(45) Date of Patent: May 3, 2016

(54) WHEELHOUSE STRUCTURE

(71) Applicant: TOYOTA JIDOSHA KABUSHIKI KAISHA, Toyota-shi, Aichi-ken (JP)

(72) Inventor: Takayuki Mashimo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/926,691

(22) Filed: Oct. 29, 2015

(30) Foreign Application Priority Data

Nov. 12, 2014 (JP) ................................. 2014-230013

(51) Int. Cl.
*B60G 3/06* (2006.01)
*B62D 25/16* (2006.01)
*B60G 7/00* (2006.01)

(52) U.S. Cl.
CPC ........ *B60G 3/06* (2013.01); *B60G 7/001* (2013.01); *B62D 25/16* (2013.01)

(58) Field of Classification Search
CPC ........... B60G 3/06; B60G 7/001; B62D 25/16
USPC .................................................. 280/124.109
See application file for complete search history.

(56) References Cited

U.S. PATENT DOCUMENTS

| 8,657,061 B1* | 2/2014 | Beaupied | B60K 5/1216 180/299 |
| 2014/0262588 A1* | 9/2014 | Bruns | B60K 1/00 180/291 |
| 2016/0009153 A1* | 1/2016 | von Hasselbach | B60G 7/001 280/124.125 |

FOREIGN PATENT DOCUMENTS

JP 2014-144658 A 8/2014

* cited by examiner

*Primary Examiner* — Faye M Fleming
(74) *Attorney, Agent, or Firm* — Oliff PLC

(57) ABSTRACT

A wheelhouse structure, including: an arm section of a suspension arm that is supported by a suspension member so as to be capable of oscillating in a vehicle vertical direction about a support axis disposed inside an engine room, and that extends from the support axis toward a side of a wheelhouse; a wheelhouse side cover that partitions the engine room from the wheelhouse, and that has a lower portion at which is formed an opening portion having a size that allows oscillation of the arm section of the suspension arm; and an arm side cover that is integrally provided at the support axis side of the arm section, and that blocks a gap between a peripheral edge of the opening portion and the arm section as viewed along an axial direction of the support axis.

4 Claims, 5 Drawing Sheets

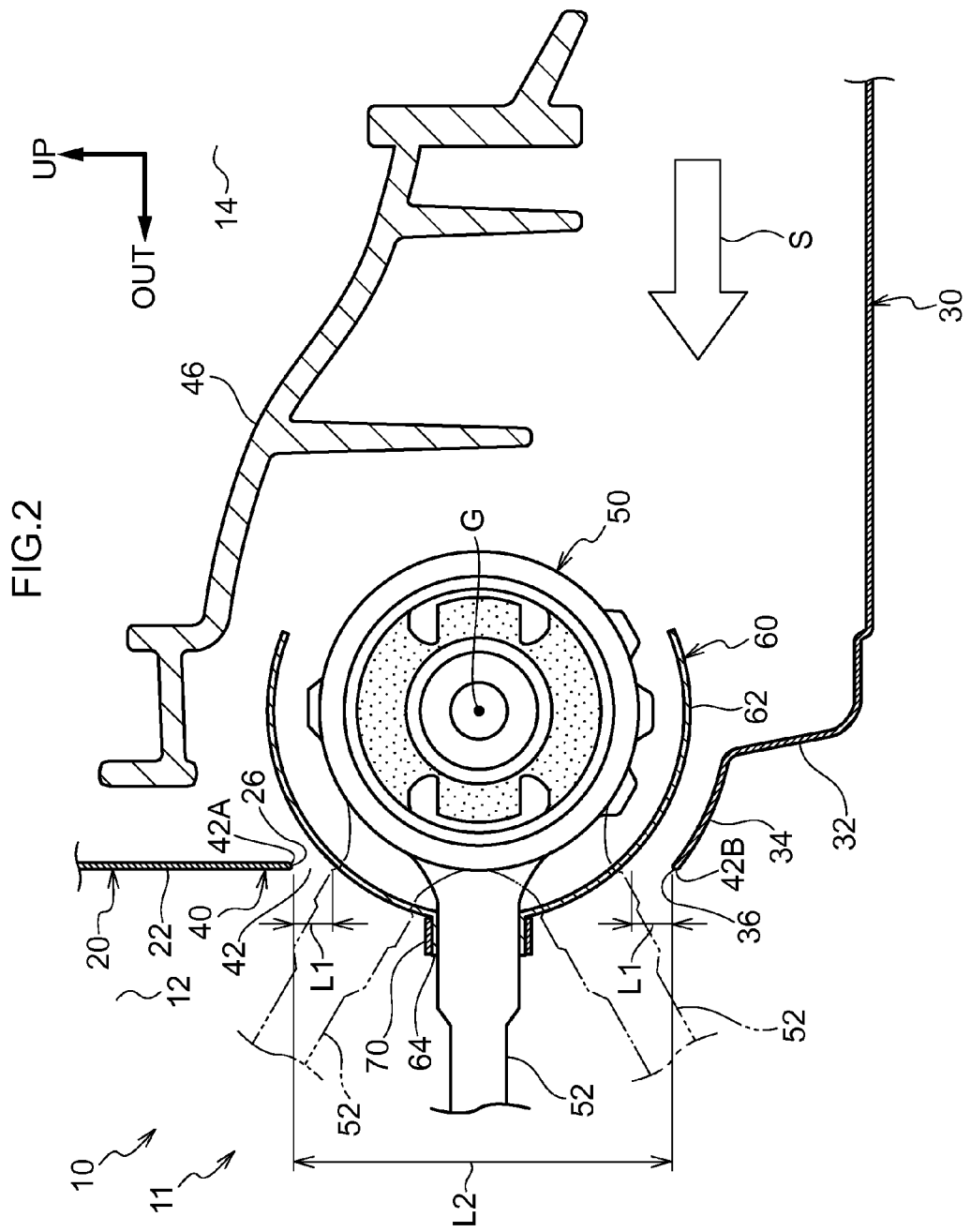

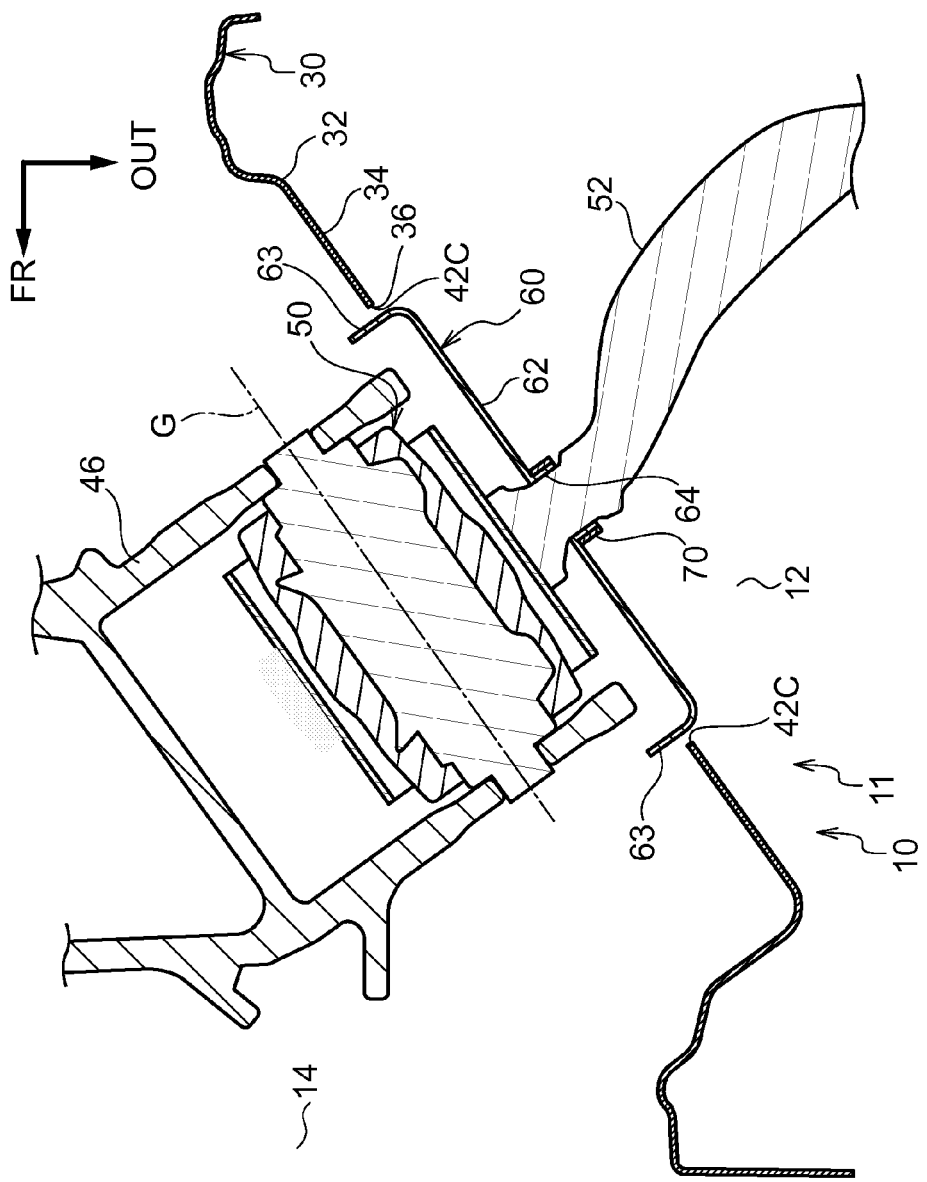

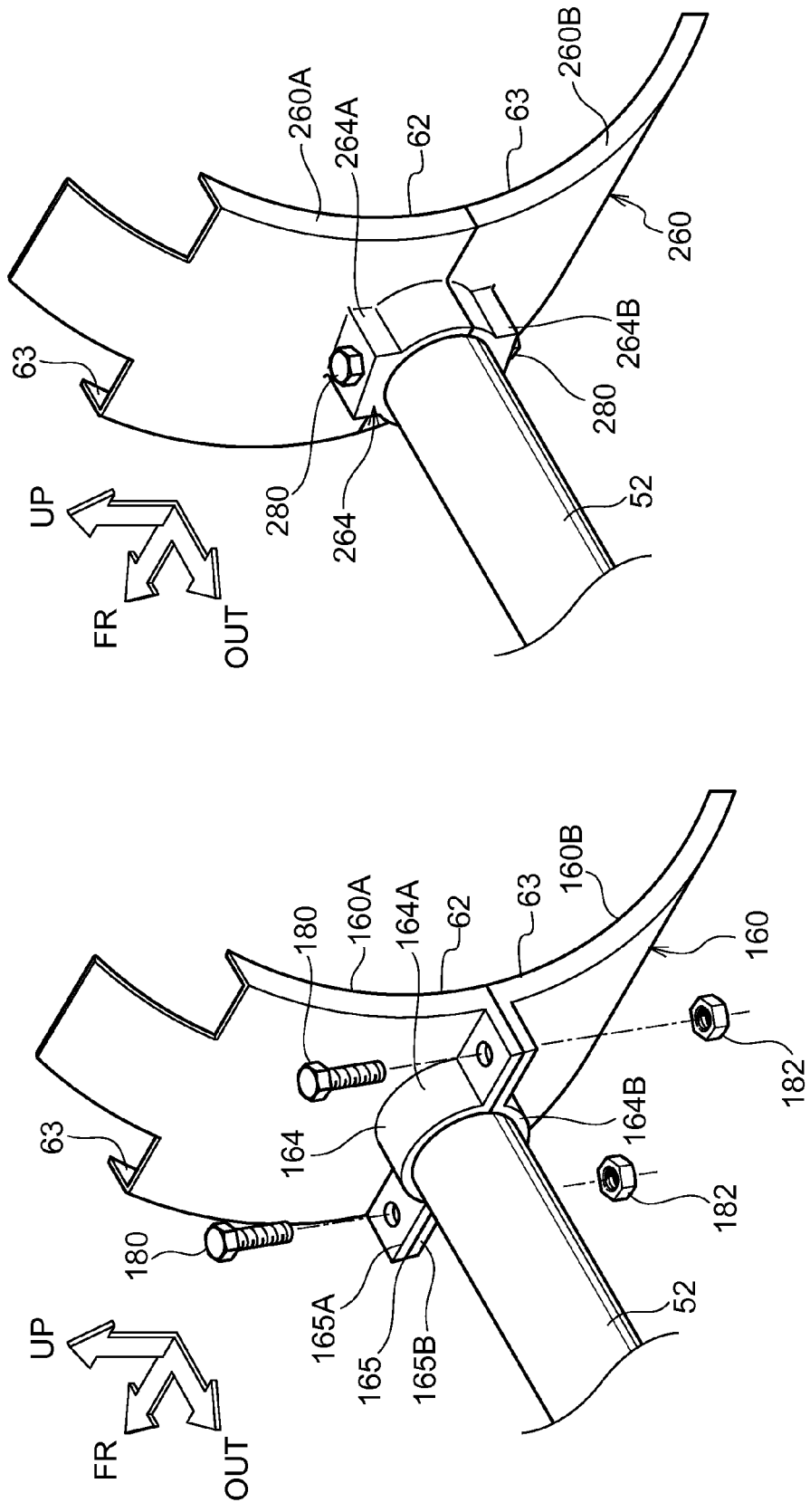

WHEELHOUSE STRUCTURE

CROSS-REFERENCE TO RELATED APPLICATION

This application claims priority under 35 USC 119 from Japanese Patent Application No. 2014-230013 filed on Nov. 12, 2014, the disclosure of which is incorporated by reference herein.

BACKGROUND

1. Technical Field

An exemplary embodiment of the present invention relates to a wheelhouse structure.

2. Description of the Related Art

A vehicle side section structure is described in Japanese Patent Application Laid-Open (JP-A) No. 2014-144658 in which an arm section of a lower arm that configures a suspension arm supported by a suspension member provided to an engine room extends toward a wheelhouse of a vehicle side section.

SUMMARY OF THE INVENTION

Therein, when travelling airflow is blown out from the engine room to the wheelhouse, this increases air resistance while travelling. A reduction in the expelled amount of travelling airflow blown out to the wheelhouse is therefore desired.

An object of an exemplary embodiment of the present invention is to provide a wheelhouse structure capable of reducing the expelled amount of travelling airflow blown out from an engine room to a wheelhouse.

A wheelhouse structure according to a first aspect includes: an arm section of a suspension arm that is supported by a suspension member so as to be capable of oscillating in a vehicle vertical direction about a support axis disposed inside an engine room, and that extends from the support axis toward a side of a wheelhouse; a wheelhouse side cover that partitions the engine room from the wheelhouse, and that has a lower portion at which is formed an opening portion having a size that allows oscillation of the arm section of the suspension arm; and an arm side cover that is integrally provided at the support axis side of the arm section, and that blocks a gap between a peripheral edge of the opening portion and the arm section as viewed along an axial direction of the support axis.

In this wheelhouse structure, travelling airflow taken into the engine room has a tendency to blow out from the engine room at a high pressure side to the wheelhouse at a low pressure side.

However, the engine room is partitioned from the wheelhouse by the wheelhouse side cover, and the arm section extends to the wheelhouse by penetrating through the opening portion. The arm side cover is provided at the arm section that extends from the opening portion of the wheelhouse side cover, and the opening portion is blocked by the arm side cover. The travelling airflow is therefore blown out to the wheelhouse through the gap between the opening portion of the wheelhouse side cover and the arm side cover.

The expelled amount of travelling airflow blown out from the engine room to the wheelhouse is therefore decreased compared to structures lacking the arm side cover.

A second aspect is the wheelhouse structure according to the first aspect, wherein the arm side cover is divided at a position of the arm section, and is fixed to the arm section on either side of the arm section.

In this wheelhouse structure, the divided arm side cover is fixed to the arm section of the suspension arm on either side of the arm section. Accordingly, for example, when a leading end side of the arm section is thicker than the fixing position of the arm side cover, is curved, or the like, the arm side cover can easily be attached to the arm section by aligning the divided arm side cover, even when insertion of the arm section from the leading end side is difficult.

A third aspect is the wheelhouse structure according to the first aspect or the second aspect, wherein the arm side cover forms a circular arc centered on the support axis as viewed along the axial direction of the support axis of the suspension arm.

In this wheelhouse structure, the shape of the arm side cover forms a circular arc centered on the support axis as viewed along the direction of the support axis of the suspension arm. This ensures that the gap between the opening portion of the wheelhouse side cover and the arm side cover is constant, even if the suspension arm rotates in the vehicle vertical direction, or the arm side cover, which is integrated to the arm section, moves in the vehicle vertical direction. The opening portion is thus blocked by the arm side cover as viewed along the support axis direction, irrespective of the vehicle vertical direction position of arm section of the suspension arm.

Advantageous Effects of Invention

The wheelhouse structure according to the first aspect enables the expelled amount of travelling airflow blown out from the engine room to the wheelhouse to be reduced.

The wheelhouse structure according to the second aspect enables the arm side cover to be easily fixed to the arm section of the suspension arm.

The wheelhouse structure according to the third aspect enables an advantageous effect of reducing the expelled amount of travelling airflow blown out from the engine room to the wheelhouse to be secured, irrespective of the vehicle vertical direction position of the arm section of the suspension arm.

BRIEF DESCRIPTION OF DRAWINGS

FIG. 2 is a vertical cross-section taken along line 2-2 in FIG. 1;

FIG. 3 is a cross-section taken along line 3-3 in FIG. 1;

FIG. 5A is a perspective view illustrating an arm side cover of a first modified example; and FIG. 5B is a perspective view of an arm side cover of a second modified example.

DETAILED DESCRIPTION OF PREFERRED EMBODIMENTS

Figure 1:
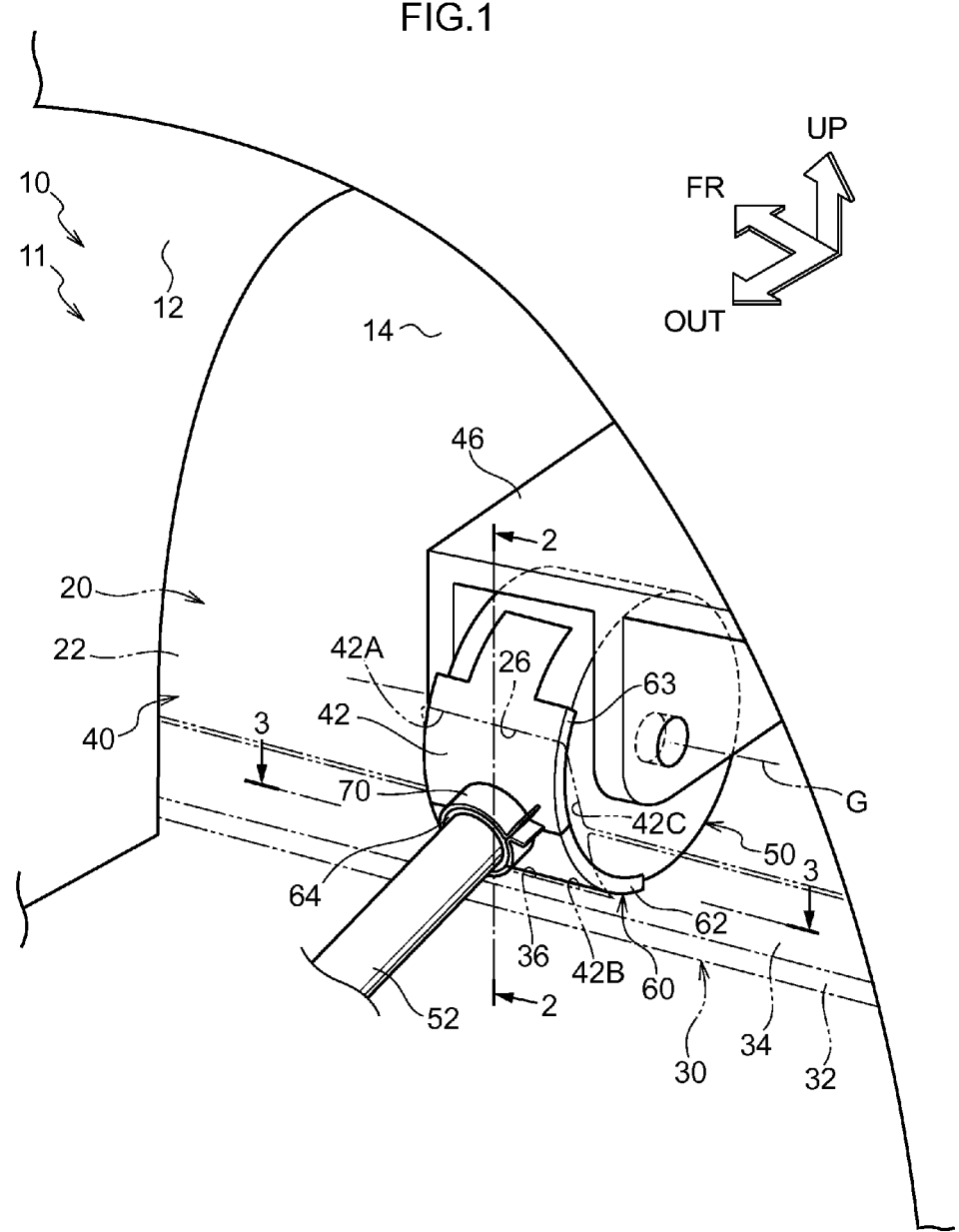
FIG. 1 is a perspective view schematically illustrating a side section of a vehicle front side section applied with a wheelhouse structure according to an exemplary embodiment of the present invention.

Explanation follows regarding a wheelhouse structure according to an exemplary embodiment of the present invention, with reference to FIG. 1 to FIG. 4. Since wheelhouses have left-right symmetry and are otherwise configured similarly to each other, the left side of a vehicle is illustrated and explained below. The arrow FR, the arrow OUT, and the arrow UP indicated in each of the drawings indicate the vehicle front-rear direction front side, the vehicle width direction outside, and the vehicle vertical direction upper side, respectively. In FIG. 1, a fender liner 20 and an engine undercover 30, described below for the sake of facilitating understanding of the structure of relevant portions, are illustrated by hypothetical lines (the double-dotted dashed lines).

Structure

As illustrated in FIG. 1 to FIG. 3, a wheelhouse 12, in which a front wheel, not illustrated in the drawings, is disposed, is provided at a vehicle side section 11 at the vehicle width direction outside of an engine room 14 of a vehicle front section 10.

As illustrated in FIG. 1 and FIG. 2, the fender liner 20 attached to a body side is provided at the wheelhouse 12. The fender liner 20 includes a liner side wall section 22, and an arch section, not illustrated in the drawings. The liner side wall section 22 is disposed at the vehicle width direction inside of the wheelhouse 12, and has its plate thickness direction along the vehicle width direction. The arch section, not illustrated in the drawings, is configured so as to extend from an outer edge of the liner side wall section 22 toward the vehicle width direction outside, curve in a substantial semicircle open at the vehicle lower side, and cover an upper side portion of the front wheel, not illustrated in the drawings.

The engine undercover 30 is provided at a lower face of the engine room 14, and is attached at the body side (see also FIG. 3). Both vehicle width direction side portions of the engine undercover 30 project upward toward the vehicle vertical direction upper side to form undercover side wall sections 32. As illustrated in FIG. 2, in the present exemplary embodiment, an extension portion 34 is formed to a leading end portion of the undercover side wall section 32, and extends toward the vehicle width direction outside. Moreover, in the present exemplary embodiment, the extension portion 34 is formed along a circular arc centered on a support axis G of a lower arm 50, described below.

As illustrated in FIG. 1, a liner side cutout portion 26, shaped as an inverted U with the open side at the vehicle lower side, is formed to a lower portion of the liner side wall section 22 of the fender liner 20 described above (see also, FIG. 2). Moreover, an undercover side cutout portion 36, shaped as a U with the open side at the vehicle upper side, is formed to an upper portion of the undercover side wall section 32 of the engine undercover 30 (see also, FIG. 2).

As illustrated in FIG. 1 and FIG. 2, a wheelhouse side cover 40 that partitions the engine room 14 from the wheelhouse 12 is configured by the liner side wall section 22 of the fender liner 20 and the undercover side wall section 32 of the engine undercover 30, and a substantially rectangular opening portion 42 is formed by the liner side cutout portion 26 and the undercover side cutout portion 36.

As illustrated in FIG. 1 to FIG. 3, a suspension member 46 is provided at the engine room 14 of the vehicle front section 10. The suspension member 46 supports the lower arm 50 that configures a front suspension arm, such that the lower arm 50 is capable of oscillating in the vehicle vertical direction. An arm section 52 that extends toward the vehicle width direction outside is provided at the lower arm 50. The front wheel, not illustrated in the drawings, is thereby supported at a front end portion of the arm section 52 through a steering knuckle.

As illustrated in FIG. 3, in the present exemplary embodiment, strictly speaking, the support axis G of the lower arm 50 is disposed at an angle with respect to the vehicle front-rear direction, and the arm section 52 extends diagonally toward the vehicle width direction outside and the rear side. Note that the arm section 52 is illustrated extending along the vehicle width direction in the other drawings in order to facilitate understanding.

As illustrated in FIG. 1 and FIG. 3, the arm section 52 of the lower arm 50 is inserted through the opening portion 42 of the wheelhouse side cover 40 described above (the opening portion 42 configured by the liner side cutout portion 26 of the fender liner 20, and the undercover side cutout portion 36 of the engine undercover 30, as described above), and extends into the wheelhouse 12.

Note that the hypothetical lines (the double-dotted dashed lines) in FIG. 2 indicate a permitted movement region of the arm section 52 in the vehicle vertical direction, within the oscillating range of the lower arm 50. If the vertical direction width L2 of the opening portion 42 of the wheelhouse side cover 40 is within the permitted movement region of the arm section 52 (within the oscillating area of the lower arm 50), then the vertical direction width L2 is set to a size at which the arm section 52 will not interfere with the opening portion 42, even if the arm section 52 moves in the vehicle vertical direction. In other words, the vertical direction width L2 of the opening portion 42 of the wheelhouse side cover 40 has a size that allows oscillation of the arm section 52 of the lower arm 50.

Figure 4B:
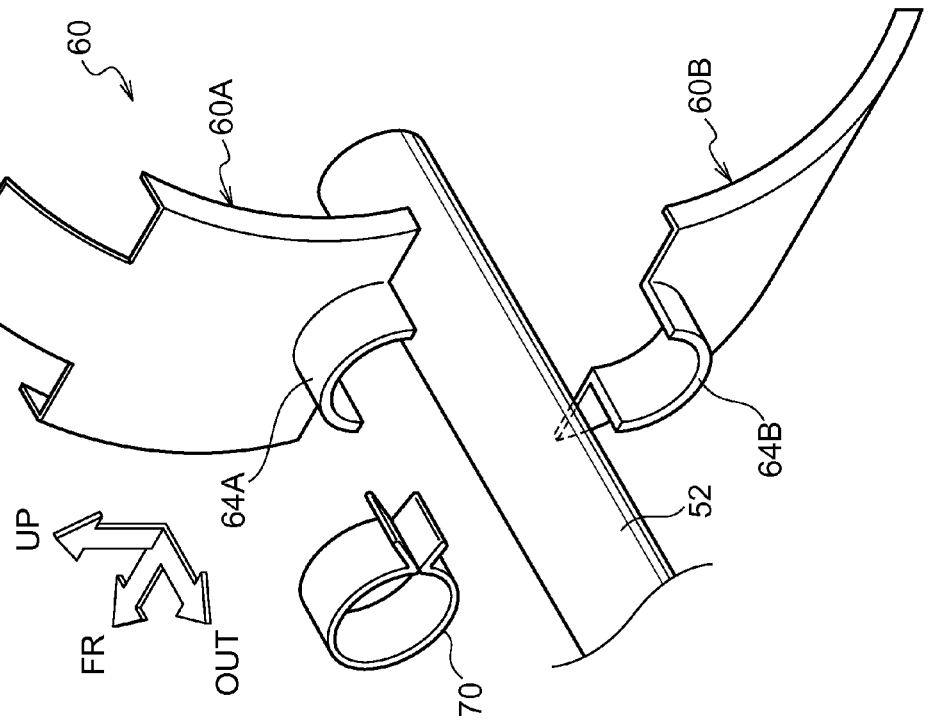
FIG. 4B is an exploded perspective view illustrating an arm side cover.
Figure 4A:
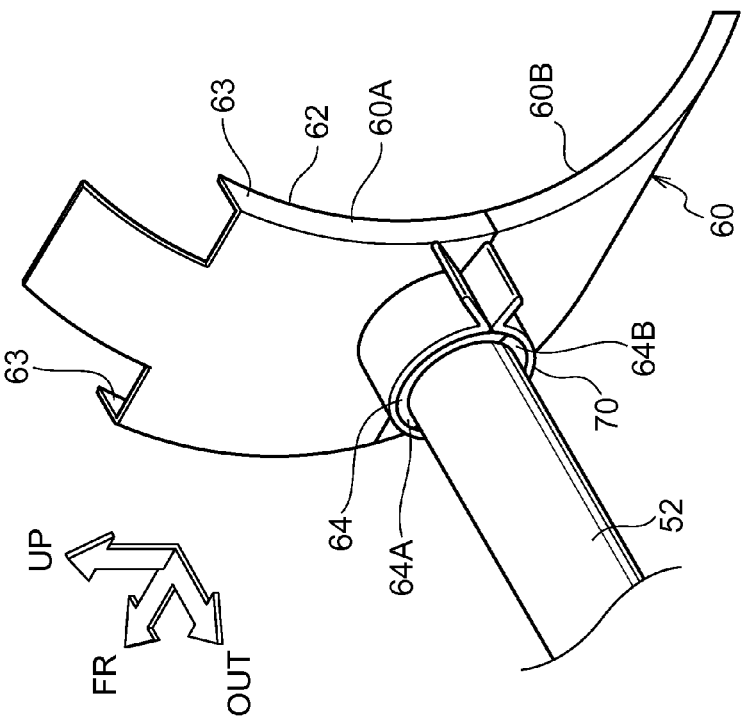
FIG. 4A is a perspective view illustrating an arm side cover.

As illustrated in FIG. 1 to FIG. 3, and FIG. 4A, an arm side cover 60 is attached to a base portion at the support axis G side of the arm section 52 of the lower arm 50. As illustrated in FIG. 1, FIG. 2, and FIG. 4A, the shape of the arm side cover 60 includes a cover main body 62 that forms a circular arc centered on the support axis G as viewed along an axial direction of the support axis G of the lower arm 50 (see FIG. 1 and FIG. 2).

As illustrated in FIG. 1, FIG. 3, and FIG. 4A, a pair of side wall sections 63 are formed to a vehicle front-rear direction end portion (an end portion in the support axis G direction) of the cover main body 62 of the arm side cover 60, and extend toward the vehicle width direction inside.

As illustrated in FIG. 2, the cover main body 62 of the arm side cover 60 is provided so as to include gaps L1 at an upper end portion 42A and at a lower end portion 42B of the opening portion 42, as viewed along the axial direction of the support axis G (see also FIG. 1). Moreover, as illustrated in FIG. 3, the cover main body 62 of the arm side cover 60 is provided such that the side wall sections 63 approach side portions 42C of the opening portion 42 (see also FIG. 1). In other words, as illustrated in FIG. 1 to FIG. 3, the cover main body 62 of the arm side cover 60 is provided so as to block the gaps between the peripheral edges (the upper end portion 42A, the lower end portion 42B, and the side portions 42C) of the opening portion 42 and the arm section 52.

As illustrated in FIG. 1 to FIG. 3, and FIG. 4A, a circular tube shaped fixing portion 64 is formed to a central portion of the cover main body 62 in the vertical direction, and is the arm section 52 of the lower arm 50 is inserted through the fixing portion 64. A C-shaped clamp 70, described below, is provided at the outside of the fixing portion 64.

More specifically, as illustrated in FIG. 4A and FIG. 4B, the arm side cover 60 of the present exemplary embodiment is divided into two in the vehicle vertical direction at the position of the arm section 52. The arm section 52 is thereby clamped between an upper side fixing portion 64A of an upper side arm side cover 60A, and a lower side fixing portion 64B of a lower side arm side cover 60B, and is fixed by the C-shaped clamp 70.

Operation and Advantageous Effects

Explanation next follows regarding operation and advantageous effects of the present exemplary embodiment.

As illustrated in FIG. 1 to FIG. 4, the arm section 52 of the lower arm 50 that is capable of oscillating in the vehicle vertical direction, extends from the opening portion 42 (the liner side cutout portion 26 and the undercover side cutout portion 36) of the wheelhouse side cover 40 (the liner side wall section 22 of the fender liner 20 and the undercover side wall section 32 of the engine undercover 30) to inside the wheelhouse 12.

The arm side cover 60 is provided at the arm section 52 so as not to interfere with the opening portion 42 as viewed along the axial direction of the support axis G of the lower arm 50.

As illustrated in FIG. 2, during vehicle travel, travelling airflow S taken into the engine room 14 from a front end portion of the vehicle front section 10 through a radiator, not illustrated in the drawings, has a tendency to blow out from the engine room 14 at a high pressure side to the wheelhouse 12 at a low pressure side.

As described above, the engine room 14 is partitioned from the wheelhouse 12 by the wheelhouse side cover 40, and the arm section 52 is inserted through the opening portion 42 and extends into the wheelhouse 12. Moreover, the arm side cover 60 is provided at the arm section 52 that extends from the opening portion 42. Thus, the travelling airflow S is blown out to the wheelhouse 12 through the gaps L1 between the opening portion 42 of the wheelhouse side cover 40 and the arm side cover 60.

The expelled amount of travelling airflow S blown out from the engine room 14 to the wheelhouse 12 is thus reduced compared to structures lacking the arm side cover 60. The vehicle air resistance caused by the travelling airflow S being blown out from the engine room 14 to the wheelhouse 12 is thereby suppressed. Namely, the vehicle air resistance is reduced compared to structures lacking the arm side cover 60.

Herein, it is necessary to set the size of the vertical direction width L2 of the opening portion 42 of the wheelhouse side cover 40 provided at the body side such that there is no interference even if the arm section 52 of the lower arm 50 moves (is displaced) in the vehicle vertical direction.

However, the region in which travelling airflow S is blown out is narrowed to the gaps L1 between the opening portion 42 of the wheelhouse side cover 40 and the arm side cover 60, due to provision on the arm section 52 of the lower arm 50 of the arm side cover 60 that moves as a unit with the arm section 52. The expelled amount of travelling airflow S blown out to the wheelhouse 12 is thereby reduced.

The shape of the cover main body 62 of the arm side cover 60 as viewed along the axial direction of the support axis G of the lower arm 50 forms a circular arc centered on the support axis G. This ensures that the gaps L1 between the cover main body 62 of the arm side cover 60 and the opening portion 42 of the wheelhouse side cover 40 is constant, even if the lower arm 50 rocks in the vehicle vertical direction, or the arm side cover 60 moves in the vehicle vertical direction as a unit with the arm section 52. Effective reduction of the expelled amount of travelling airflow S blown out from the engine room 14 to the wheelhouse 12 is accordingly secured, irrespective of the vehicle vertical direction position of the arm section 52 of the lower arm 50.

As illustrated in FIG. 4A and FIG. 4B, the arm side cover 60 of the present exemplary embodiment is divided in the vehicle vertical direction at the position of the arm section 52. The arm section 52 is clamped between the upper side fixing portion 64A of the upper side arm side cover 60A and the lower side fixing portion 64B of the lower side arm side cover 60B, and fixed by the C-shaped clamp 70. Accordingly, for example, when the leading end side of the arm section 52 is thicker than the base portion (the fixing position of the arm side cover 60), is curved, or the like, the arm side cover 60 can easily be attached and fixed to the arm section 52 by aligning the divided upper side arm side cover 60A and lower side arm side cover 60B, even when it is difficult for the arm section 52 to penetrate the tube shaped fixing portion 64 of the arm side cover 60.

MODIFIED EXAMPLES

Explanation next follows regarding modified examples of the arm side cover 60 attached to the arm section 52 of the lower arm 50, with reference to FIGS. 5A, 5B. Note that members similar to those of the exemplary embodiment above are allocated the same reference numerals, and redundant explanation thereof is omitted.

First Modified Example

An arm side cover 160 of a first modified example illustrated in FIG. 5A includes the cover main body 62 and a fixing section 164 through which the arm section 52 is inserted. Moreover, a flange portion 165 that extends toward the outside is formed to the fixing section 164. The arm side cover 160 is divided in the vehicle vertical direction at the position of the arm section 52. The arm section 52 is thereby clamped between an upper side fixing portion 164A of an upper side arm side cover 160A and a lower side fixing portion 164B of a lower side arm side cover 160B, and a flange portion 165A and a flange portion 165B are fastened together by bolts 180 and nuts 182, thereby fixing the arm side cover 160 to an outer peripheral portion of the arm section 52.

Second Modified Example

An arm side cover 260 of a second modified example illustrated in FIG. 5B includes the cover main body 62 and a substantially circular tube shaped fixing portion 264 penetrated by the arm section 52. The arm side cover 260 is divided in the vehicle vertical direction at the position of the arm section 52. The arm section 52 is thereby clamped between an upper side fixing portion 264A of an upper side arm side cover 260A and a lower side fixing portion 264B of a low side arm side cover 260B, and respective upper and lower bolts 280 are screwed on from the top and bottom, thereby fixing the arm side cover 260 to an outer peripheral portion of the arm section 52.

Note that in the arm side cover 160 of the first modified example and the arm side cover 260 of the second modified example, the arm side cover 160, 260 is mechanically, firmly fixed to the arm section 52 by the bolts 180 and the nuts 182, or by the bolts 280. The state of attachment of the arm side cover 160, 260 to the arm section 52 is therefore more stable than in the arm side cover 60 fixed by the clamp 70 illustrated in FIG. 4.

Other

Note that the present invention is not limited to above exemplary embodiment.

For example, although explanation has been given in which the present invention is applied to the wheelhouse 12 of the vehicle side section 11 of the vehicle front section 10 in the above exemplary embodiment and modified examples, there is no limitation thereto. The present invention may also be applied to a rear wheelhouse of a vehicle rear section, as long as an engine room in which the engine is disposed is provided at the vehicle rear section in a structure in which travelling airflow is blown out to the rear wheelhouse as travelling airflow is taken into the engine room.

As another example, although the arm side cover 60, 160, 260 has a structure divided in the vehicle vertical direction in the exemplary embodiment and modified examples above, there is no limitation thereto. For example, the structure may be divided in the vehicle front-rear direction.

As another example, although the arm side cover 60, 160, 260 is provided at the arm section 52 of the lower arm 50 in the exemplary embodiment and modified examples above, there is no limitation thereto. Provision may be made to an arm section of a suspension arm according to the form and disposition of the suspension.

Moreover, it goes without saying that various modes can be implemented within a range not departing from the spirit of the present invention.

The entire contents of the disclosure of JPA No. 2014-230013, filed on Nov. 12, 2014 are incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference.

What is claimed is:

1. A wheelhouse structure, comprising:
   an arm section of a suspension arm that is supported by a suspension member so as to be capable of oscillating in a vehicle vertical direction about a support axis disposed inside an engine room, and that extends from the support axis toward a side of a wheelhouse;
   a wheelhouse side cover that partitions the engine room from the wheelhouse, and that has a lower portion at which is formed an opening portion having a size that allows oscillation of the arm section of the suspension arm; and
   an arm side cover that is integrally provided at the support axis side of the arm section, and that blocks a gap between a peripheral edge of the opening portion and the arm section as viewed along an axial direction of the support axis.

2. The wheelhouse structure of claim 1, wherein the arm side cover is divided at a position of the arm section, and is fixed to the arm section on either side of the arm section.

3. The wheelhouse structure of claim 1, wherein the arm side cover forms a circular arc centered on the support axis as viewed along the axial direction of the support axis of the suspension arm.

4. The wheelhouse structure of claim 2, wherein the arm side cover forms a circular arc centered on the support axis as viewed along the axial direction of the support axis of the suspension arm.

* * * * *